(12) United States Patent
Novak (10) Patent No.: US 8,365,264 B2
(45) Date of Patent: Jan. 29, 2013

(54) PROTECTING PASSWORD FROM ATTACK

(75) Inventor: Mark F. Novak, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 574 days.

(21) Appl. No.: 12/577,711

(22) Filed: Oct. 12, 2009

(65) Prior Publication Data

US 2011/0088085 A1    Apr. 14, 2011

(51) Int. Cl.
*H04L 29/06* (2006.01)
(52) U.S. Cl. .......................................................... 726/7
(58) Field of Classification Search .................. 726/5, 6, 726/7
See application file for complete search history.

(56) References Cited

U.S. PATENT DOCUMENTS

| | | | |
|---|---|---|---|
| 2005/0198501 A1* | 9/2005 | Andreev et al. | 713/168 |
| 2006/0041759 A1 | 2/2006 | Kaliski et al. | |
| 2007/0033642 A1 | 2/2007 | Ganesan et al. | |
| 2007/0067828 A1 | 3/2007 | Bychkov | |
| 2007/0220595 A1 | 9/2007 | M'raihi et al. | |
| 2007/0245148 A1* | 10/2007 | Buer | 713/182 |
| 2008/0034216 A1 | 2/2008 | Law | |
| 2009/0037988 A1* | 2/2009 | Yang et al. | 726/6 |

OTHER PUBLICATIONS

Wuest, Candid, "'Phishing in the Middle of the Stream' Today's Threats to Online Banking", Retrieved at <<http://www.symantec.com/avcenter/reference/phishing.in.the.middle.of.the.stream.pdf>>, In the proceedings of the AVAR 2005 conference, dated: 2005, pp. 1-28.

Griffin, Dan, "Safer Authentication with a One-Time Password Solution", Retrieved at <<http://msdn.microsoft.com/en-us/magazine/cc507635.aspx>> retrieved on: Jul. 23, 2009, pp. 1-10.

Williams, N., "On the Use of Channel Bindings to Secure Channels", retrieved at <<http://tools.ietf.org/html/rfc5056>>, Nov. 2007, 24 pages.

* cited by examiner

*Primary Examiner* — Jason Gee (57) ABSTRACT

A password may be provided along with a validation code, which can help prevent the password from being sent to the wrong recipient. When a password is created, a validation code may be created based on (a) the password, and (b) the identity of the target of authentication (TA) to which the password is intended to be sent. When a user is requested to provide a password, validation component intercepts the request and asks the user to enter both the password and validation code. The validation component then re-calculates the validation code based on the entered password and on the TA that is requesting the password. If the re-calculated validation code matches the validation code entered by the user, then the password is released to the user agent that the user uses to communicate with the TA, and the user agent sends the password to the requesting TA.

20 Claims, 4 Drawing Sheets

PROTECTING PASSWORD FROM ATTACK

BACKGROUND

Passwords are often used to gate access to various kinds of resources and processes. A person who wishes to gain access to a resource or process may be asked to enter a password. If the person enters the correct password, then access may be granted. Otherwise, access may be withheld. Mail accounts, shopping accounts, bank accounts, school records, etc., are some examples of things to which access may be password-controlled. One type of password whose use has become common is the one-time password. One-time passwords may be used, for example, as part of a registration process, or as part of a password reset process. Additionally, one-time password generators are increasingly being put in use for day-to-day authentication.

An issue that arises in the use of passwords is that they are subject to certain types of attacks. One type of attack is a phishing attack, in which an attacker attempts to get the holder of a password to provide the password to the attacker. One way of executing a phishing attack is to create a fake web site that looks like the web site into which the user is supposed to enter the password. A user might visit the fake web site accidentally—e.g., by misspelling a part of the real web site's Uniform Resource Locator (URL) when typing the URL into a browser's address bar. In such a case, the user might not notice the error in time, and might enter the password into the fake web site. Thus, the attacker would be in possession of a valid password. Even if the password is intended for one-time use, the attacker would have a valid password that could be used for a short time.

SUMMARY

A password may be provided to a user with a validation code. At some point in time after the user receives the password, a target of authentication (TA) may ask the user to enter the password. The TA is an entity to whom the user is being asked to prove that he or she is in possession of the password. For example, a server may be a target of authentication, in the sense that the server may generate a web page that asks the user to enter a password before the server allows the user to do something. When a user enters the password, a user agent (e.g., the browser or other software) may see that the web page is requesting a password, and may use a secure trusted validation component to collect the password. The validation component may also ask the user to enter a validation code, and then may use the validation code to perform a validation test. The validation test seeks to determine whether the TA is a valid entity that is allowed to receive the password that the user has entered. If the validation test passes, then the validation component provides the password to the user agent, which then forwards the password to the TA. If the validation test fails, then the validation component does not provide the password to the user agent, thereby preventing the password from being forwarded to the TA.

The validation code is created by a function that is known both to the entity that creates the code and to the user agent that validates the code. The function creates the validation code based on the identity of the legitimate TA to which the password is to be presented, and based on the password itself. The identity of the TA may be based on the TA's endpoint binding, or based on a channel binding that is specific to a particular communication channel between the user agent and the TA.

Validation codes may be used with one-time passwords as part of a device registration process. For example, a user might want to register a particular computer for use with an online shopping service, so that purchases made from that computer can be charged automatically to the user's credit card. In order to register a computer, the shopping service might send the user a one-time password and validation code through an out-of-band communication mechanism (e.g., a cell phone text message). The shopping service could then ask the user to visit a particular web site from the computer he intends to register, and to enter the password into a web form provided by that web site. If an attacker learns the password through phishing, then the attacker could register his or her own computer, and the attacker's purchases could be charged to the legitimate user's credit card. In order to prevent the attacker from learning the password through phishing, when the user uses a browser to visit the specified web site and that site asks for the password, a validation component could intercept the process and ask the user to enter the password and his version of the validation code. The validation component could then generate the validation code by applying the validation-code-generating function to the password and to the binding associated with the web site. The validation component could then compare the generated validation code with the validation code that the user has entered. If the validation codes match, then the validation component releases the password to the browser, which may send it to the requesting web site. If the validation codes do not match (which might happen, for example, if the web site that the user has visited is not the same one that the shopping service asked the user to visit), then the validation component could avoid releasing the password to the browser, thereby preventing the password from being sent to the requesting web site. The browser might also warn the user that the web site that requested the password is not a valid recipient for that password.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Passwords have long been used to gate access to computing processes. However, passwords are subject to being stolen. In security terms, the premise of the password is that only the person who is legitimately entitled to access a resource would know the password. Thus, when a requestor asks to access a resource, the resource guard asks the requestor to enter the password. If the requestor enters the correct password, then the guard draws the conclusion that the requestor is the person who has a legitimate right to access the resource. Otherwise, the guard concludes that the requestor does not have the right to access the resource, and denies access.

Passwords are used to control access to various types of resources and processes. User accounts, bank account, school records, and medical records are some examples of resources to which access may be gated with passwords. In addition to controlling access to resources, processes can also be used to control access to processes. For example, a user might want to reset a long-term password, or might want to register a particular device to be used with some service, such as an on-line shopping service. In the example of registering a device for use with a shopping service, registration of the device might allow anyone who uses the device to charge purchases to the registered user's credit card. Thus, there is reason to ensure that only the person whose credit card will be charged can register a device to that credit card. In order to perform the registration process, the service might communicate a password to the user through some presumptively secure channel (e.g., by Short Message Service (SMS) message to the user's cell phone). The service might then ask the user to visit a particular web site from the device that the user wishes to register, and then to enter the password into the web site. Since the channel through which the password is communicated is presumptively secure, it can be assumed—to some level of certainty—that the only person who knows the password is the user to whom the password was sent. As an added measure of security, such passwords are generally provided for very short-term (e.g., one-time) use. Such a password could be used to register a single device, after which the guard would no longer accept the password.

However, one danger that arises with any password is the possibility that it can be stolen. As noted above, the basis on which a password provides security is the assumption that only the legitimate user of the password knows the password. If this assumption is not true, then the password no longer provides the intended security. If an interloper learns the password and then presents it to the resource guard, then the interloper can gain the same access as the legitimate user. In the case of one-time passwords, the possibility that an interloper could use the password is greatly reduced as compared with durable passwords. By the time an interloper could use a stolen one-time password, it is likely (although not certain) that the password would already have been used. However, it is still possible to use a stolen password. If the interloper obtains the password very soon after the password is created—and then uses the password very quickly—the interloper might be able to use the one-time password.

One way that an interloper might obtain the password is through a phishing attack. For example, suppose that a user wants to register his computer (or other device) with a shopping service called "shop.example.com", so that anytime the user buys an item with that service, the item is automatically charged to his credit card. In other words, registration (in this example) associates the user's computer with the user's credit card. In order to register the computer, the user contacts the shop.example.com service and requests a registration password. The service might respond by sending the user a one-time password through some presumptive-secure out-of-band mechanism, like an SMS message, paper mail, a telephone call, etc. The service then asks the user to visit the shop.example.com web site from the computer to be registered, and to enter the one-time password into the web site. The service would then receive and validate the password. If the password is valid, the service could then begin to recognize the user's computer as being authorized to charge purchases to the user's credit card. An interloper who wants to launch a phishing attack against this process could do so as follows. The interloper could set up a web site with a similar URL that a user could easily enter by mistake—e.g., "shpp.example.com" or "sjop.example.com". The interloper could then design a web site that looks very similar to the legitimate "shop.example.com" web site. If the user accidentally typed the wrong URL and then saw the similar-looking web site, the user likely would not notice his typographical error, and would enter the one-time password into the phishing web site that the interloper had set up. The interloper would then have a one-time password that is likely to be valid for at least a few minutes. The interloper could then visit the real "shop.example.com" web site and use the password to register his own device. At that point, the interloper's device would be able to charge purchases to the original user's credit card.

The reason that the above-described phishing attack works is that the web site that asks the user to enter the password is not effectively authenticated before the password is sent to that site. The user typically examines the page and notes that it looks like the "shop.example.com" web site, at which point the user decides that it is safe to enter the password. However, since web page appearances can easily be copied, these actions provide only a crude form of authentication, which is ineffective to prevent phishing. Stronger authentication of the web site that is requesting the password could prevent many phishing attacks.

The subject matter described herein provides a way to authenticate the entity to which a password is to be sent. Authentication decreases the chance that the password would be sent to an entity other than the one for which the password is intended. If the user accidentally tries to send a password to the wrong entity (e.g., in the example of the URL typo described above), transmission of the password could be prevented, and the user could be alerted to the error.

In general, the entity to which possession of a password is to be proved is called a target of authentication (TA). For example, if a web server requests a password (e.g., as part of a login process, as part of a device registration process, as part of a password reset process, etc.), then the web server is a TA. The validation code could be created by a function, F, that produces the validation code based on a password and based on the identity of the TA. (Such a function may be described by the phrase "Validation Code=F(Password,TA)", meaning that F is applied to a password and to a binding of a TA, and then generates a validation code based on the password and the TA's binding.) Function F is publicly known. Thus, it is known to the entity that creates the password. Function F is also known to secure validation components that are used on the client-side; these validation components may intervene when a user is asked to enter a password, and may provide the password to the user agent (e.g., a browser, or some other type of client) for submission to the requesting entity only upon successful validation. The entity that supplies the password uses function F to calculate the validation code, and sends the password and validation code to the user. When the validation component intervenes in the collection of the password, it collects both the password and validation code from the user. The validation component uses function F to re-calculate the validation code, and then compares the re-calculated code with the code entered by the user. The validation code depends both on the password, and on the identity of the TA to which the password is to be submitted. Thus, when the user visits a URL and the TA associated with that URL asks for a password, the validation component can use function F to calculate the validation code based on both the password and the TA. If either the password or the TA to which the validation component applies function F are different from the password and TA that were originally used to create the validation code provided to the user, then the validation code entered by the user is unlikely to match the validation code re-calculated by the validation component. If such a mismatch occurs, then it is likely that the user is attempting to provide the password to a TA other than the one for which the password is intended (e.g., because of a typo in the URL, or for some other reason). The validation component can then avoid releasing the password to the user agent, and might even alert the user to the error. In this way, the validation component can prevent the user from accidentally providing the password to an attacker.

Figure 1:
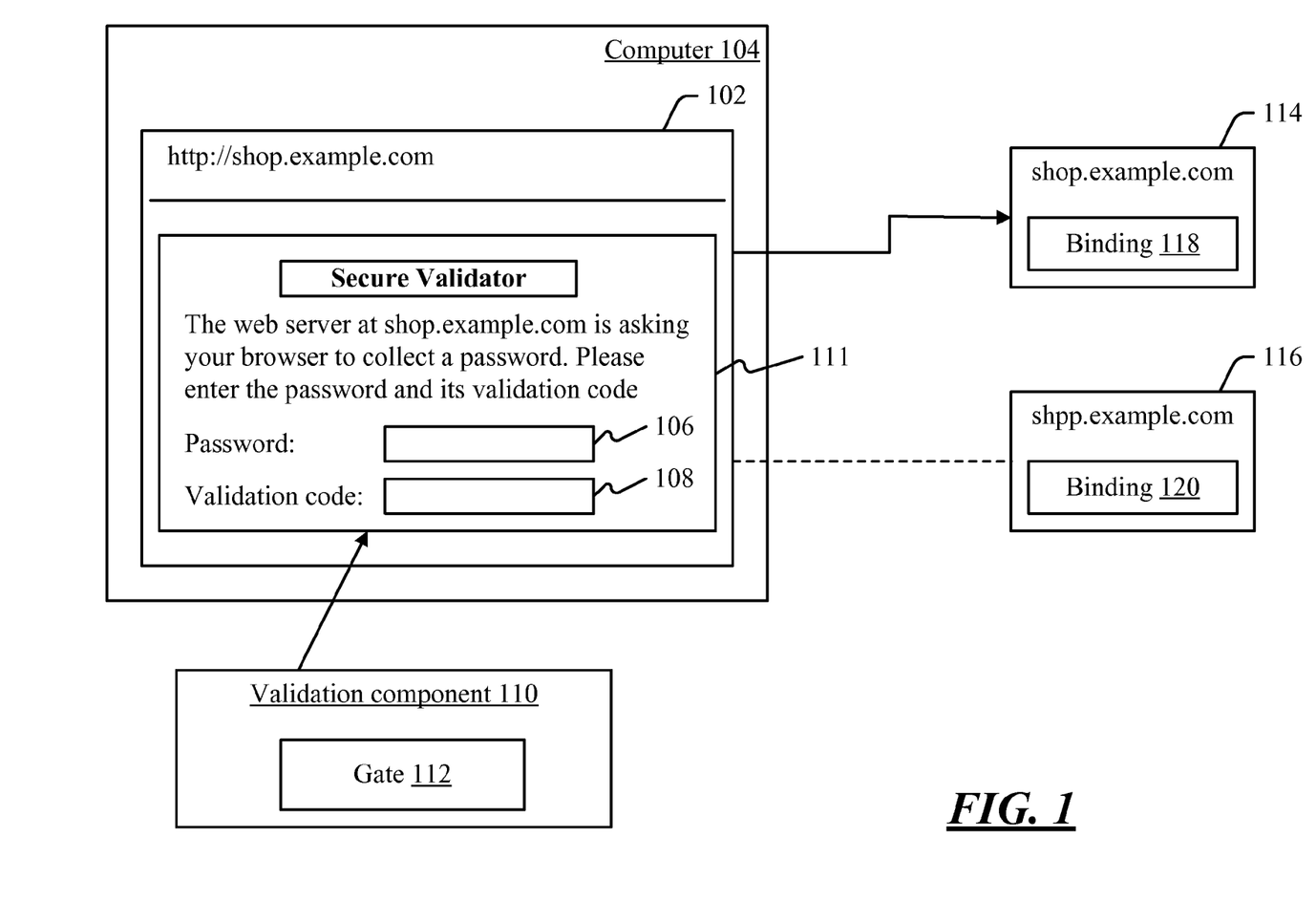
FIG. 1 is a block diagram of an example scenario in which a validation is performed before transmitting a password.

Turning now to the drawings, FIG. 1 shows an example scenario in which a validation is performed before transmitting a password. In the example of FIG. 1, a user has received a password and a validation code. Mechanisms by which the password and validation code are sent to the user are described below. For the purpose of FIG. 1, it is assumed that the user has received the password and validation code by some mechanism. Browser 102 is a program that runs on computer 104. Browser 102 may be a typical web browser, such as the MICROSOFT INTERNET EXPLORER browser, the Mozilla Firefox browser, etc. In general, a user agent is a program that operates on a computer and that allows a user to communicate with a server. Browser 102 is an example of such a user agent.

In the example of FIG. 1, a user has used browser 102 to visit the URL shop.example.com. When that URL is accessed through browser 102, the server associated with shop.example.com provides a web page. The web page may generate a request that the user enter a password. When such a request is made, validation component 110 may intervene in order to collect the password from the user before the password is provided to the user agent. (The validation component may be more secure than the user agent, and it may be presumed that—once the password is in the possession of the user agent—the user agent might transmit it to the requesting entity. Thus, in order to prevent the password from being transmitted to an inappropriate entity, the validation component 110 may intervene in the collection of the password.) In particular, validation component 110 may present a dialog box 111 that includes, for example, a box 106 into which to enter a password, and a box 108 into which to enter a validation code.

Validation component 110 implements a function that calculates a validation code, so that the calculated validation code can be compared with the validation code that the user enters into box 108. In one example, validation component 110 implements the function F (described above), which calculates the validation code based on the password entered into box 106, and based on the TA to which the user is attempting to send the password. Validation component 110 may implement the same function that was originally used to create the validation code that was sent to the user (e.g., the validation code provided to the user may also have been created with function F). Given the correct password and the correct target of authentication, validation component 110 creates the same validation code that was given to the user. Thus, if the user enters the password and validation code that he was given, and attempts to provide the password to the correct web site, then validation component 110 will create the same validation code as the one that the user enters in box 108.

Validation component 110 compares the validation code that it creates with the validation code that the user enters in box 108. The validation component may then either release the password to browser 102, or may withhold the password from browser 102. Validation component 110 may use gate 112 to determine, based on the comparison of validation codes, whether to release the password. In the event that the validation code created by validation component 110 matches the one that was entered into box 108, then gate 112 allows the password to be released to browser 102 (whereupon browser 102 may send the password to the TA that requested the password). Otherwise, gate 112 does not allow the password to be released to browser 102.

FIG. 1 shows how the decision of whether to release the password to browser 102 may depend on the identity of the TA. FIG. 1 shows TA 114 referenced by the URL "shop.example.com", and TA 116 referenced by the URL "shpp.example.com". In this example, "shop.example.com" is the TA to which the user is intended to provide the password, and "shpp.example.com" is a phishing site that attempts to phish passwords by exploiting the similarity between the strings "shop" and "shpp". TA 114 is identified by binding 118, and TA 116 is identified by binding 120. Bindings 118 and 120 may be endpoint bindings that are specific to TAs 114 and 116 respectively, but that are valid for all times. Or, as another example, bindings 118 and 120 may be per-channel bindings, which are specific to TAs 114 and 116 respectively, and are also specific to a particular communication session that takes place at a particular time. Thus, binding 118 identifies TA 114, and may also identify a particular communication session that TA 114 engages in. Similarly, binding 120 identifies TA 116, and may also identify a particular communication session that TA 116 engages in.

In the example of FIG. 1, the user has visited "shop.example.com". Thus, when the user enters the password and validation code into boxes 106 and 108, validation component 110 re-calculates the validation code based on the password and based on the binding 118 of the TA to which the user is attempting to provide the password. Since it was intended that the password given to the user would be transmitted to TA 114, the validation code that was given to the user was created based on that password and also based on TA 114's binding (i.e., binding 118). Thus, when validation component 110 re-calculates the validation code, the validation code will match the one that was given to, and entered by, the user. Based on this match, gate 112 will allow the password to be released to browser 102, whereupon the browser 102 will send the password to TA 114.

If, on the other hand, the user had accidentally visited "shpp.example.com" and had attempted to send the password to TA 116, validation component 110 would have re-calculated the validation code based on the entered password and based on binding 120. Since the validation code calculated based on the combination of the password and binding 120 would not be the same as the one entered by the user (which, it will be recalled, was created based on the combination of the password and binding 118), gate 112 will determine that there is no match between the validation codes, and would avoid sending the password to TA 116.

Figure 2:
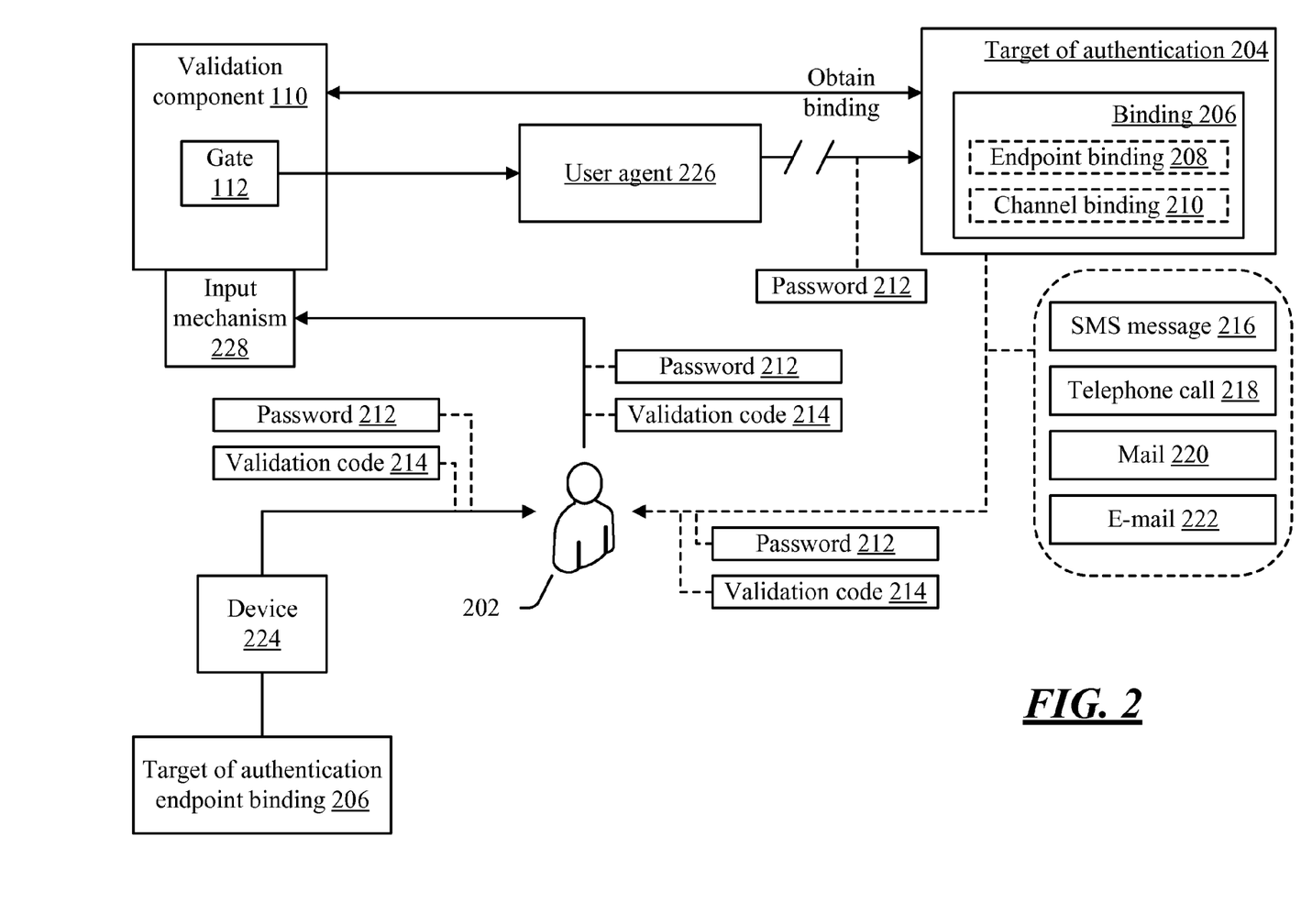
FIG. 2 is a block diagram of an example scenario in which a user receives a password and validation code, and then uses the password and code.

FIG. 2 shows an example scenario in which a user receives a password and validation code, and then uses the password and code.

User 202 receives a password and validation code from an entity. There are various examples of an entity from which the user could receive the password and validation code. FIG. 2 shows two such examples: one where the password and authentication code are provided to the user by the TA, and another where the password and authentication code are provided by a device (such as a dongle, or other device).

As described above, the entity to which the user will ultimately be asked to prove possession of the password is the target of authentication, or "TA". The TA shown in FIG. 2 is target of authentication 204. Thus, in the first example, the entity that sends the password and validation code to user 202 is target of authentication 204 itself. In such an example, target of authentication 204 has a binding 206, by which target of authentication 204 can be identified. Binding 206 could be an endpoint binding 208, which is specific to target of authentication 204, but is not specific to any particular communication session. Or, as another example, binding 206 could be a channel binding 210, which is specific to a particular target of authentication, and to a particular communication session in which the target of authentication engages. Regardless of which type of binding is used, target of authentication 204 may generate a password, and then may generate a validation code based on the password and based on the appropriate binding 206. As noted above, the validation code could be generated by a function, such as F(password,TA), which takes as input (a) the password, and (b) a binding associated with a particular TA. Once the password 212 and validation code 214 have been created, they may be sent to user 202. Typically, password 212 and validation code 214 are sent via a channel that is presumed secure, in the sense that it can be presumed that interlopers do not have access to data transmitted over these channels (or, at least, that interlopers do not have access to data transmitted over these channels over the time horizon during which the password is expected to be used). Some examples of these channels include SMS message 216 (e.g., the password and validation code are text-messaged to the user's cell phone); telephone call 218 (e.g., a human operator calls the user and tells the user the password and validation code); mail 220 (e.g., a paper containing the password and validation code is sent to the user via government-operated mail, or via some other physical delivery service); and e-mail 222 (e.g., the password and validation code are e-mailed to the user). Through one of these channels (or through some other channel), password 212 and validation code 214 are received by user 202. Since the user agent through which the user will later present the password may be presumed to be insufficiently secure, the channel through which password 212 and validation code are communicated to user 202 is typically not the one that the user agent shares with the target of authentication. For example, the password and validation code typically would not be sent to the user through the browser itself.

In the second example, the entity that provides the password and validation code to user 202 is a device other than target of authentication 204. In the example of FIG. 2, device 224 is such a device. Device 224 might be handheld computer, a cell phone, a dongle, or some other device. A user might want to register device 224 to allow device 224 to be used with a service. For example, a user might want to register a dongle for use with the "shop.example.com" shopping service, so that the user's credit card can be used for purchase whenever the dongle is attached to the computer. Device 224 could then provide user 202 password 212 and validation code 214. For example, if device 224 is a cell phone, then device 224 could display password 212 and validation code 214, along with instructions to visit a particular URL and to enter the password and validation code into a web form provided by that URL. Or, if device 224 is a dongle, then the user could read the password and validation code from the dongle (e.g., in the case of a keychain dongle with a small LCD display). Device 224 could provide the password and validation code to the user in any appropriate manner. One aspect of device 224's ability to provide the correct validation code is that device 224 knows the binding 206 of the TA to which the user will prove knowledge of the password. Device 224 may not know exactly when, or by what channel, user 202 will contact that TA, so—in the case where device 224 provides the password and validation code—it may not be possible to use a channel binding. However, device 224 can create the validation code based on the TA's endpoint binding. Device 224 may have an implementation of the function F(password, TA), so that it can create a legitimate validation code based on a password.

At some point, user 202 may be asked to provide password 212 to target of authentication 204. For example, the user may use a user agent 226 to visit a URL, in response to which the target of authentication may request that the user enter the password. The target of authentication could make this request, for example, through the user's browser. When such a request is made, validation component 110 may intervene and may display a dialog box with a request that the user enter the password and the validation code, In response to the request, the user may use an input mechanism 228 (e.g., keyboard, touch screen, mouse, etc.) to enter the password and validation code into the dialog box provided by validation component 110. Validation component 110 may include gate 112 to determine whether to release the entered password to user agent 226. (Both validation component 110 and gate 112 are both described above in connection with FIG. 1.) Validation component 110 may implement the function F(password,TA), so that it can calculate a validation code from a password and from a TA binding. Gate 112 may determine whether the password is to be released to user agent 226, based on a comparison of the validation code that user 202 enters with the validation code that validation component 110 calculates. If the password is released to the user agent, then user agent may use the password to respond to target of authentication 204's request for the password. The validation code typically is not released to the user agent. Since the user agent is not presumed to be sufficiently secure, there is a risk that the user agent would provide data that it receives to an inappropriate entity; if the user agent does not come into possession of the validation code, then there is no danger that the user agent would give the validation code to an inappropriate entity.

Thus, user 202 uses user agent 226 to contact target of authentication 204. At some point, target of authentication 204 requests that the user enter password 212. At that point, validation component 110 may intervene, and request that user 202 enter password 212 and validation code 214. Validation component may then calculate a validation code based on the password that has been entered, and on the TA that is requesting the password. Thus, validation component 110 may communicate with target of authentication 204 in order to obtain the binding associated with target of authentication 204. When the binding has been obtained, validation component 110 may use function F to calculate the validation code. Gate 112 may then compare the calculated validation code with the actual validation code 214 that user 202 entered into user agent 226. If the entered validation code matches the calculated validation code, then gate 112 releases password 212 to user agent 226, and user agent 226 sends password 212 to target of authentication 204. If the validation codes do not match (e.g., in the case where the user accidentally contacted a phishing site, such as "shpp.example.com"), then gate 112 does not release password 212 to user agent 226, and the password is not sent to the target of authentication. (The diagonal lines that lie across the connection between user agent 226 and target of authentication 204 indicate that password 212 may, or may not, be sent to target of authentication, depending on the conditions described above.)

Figure 3:
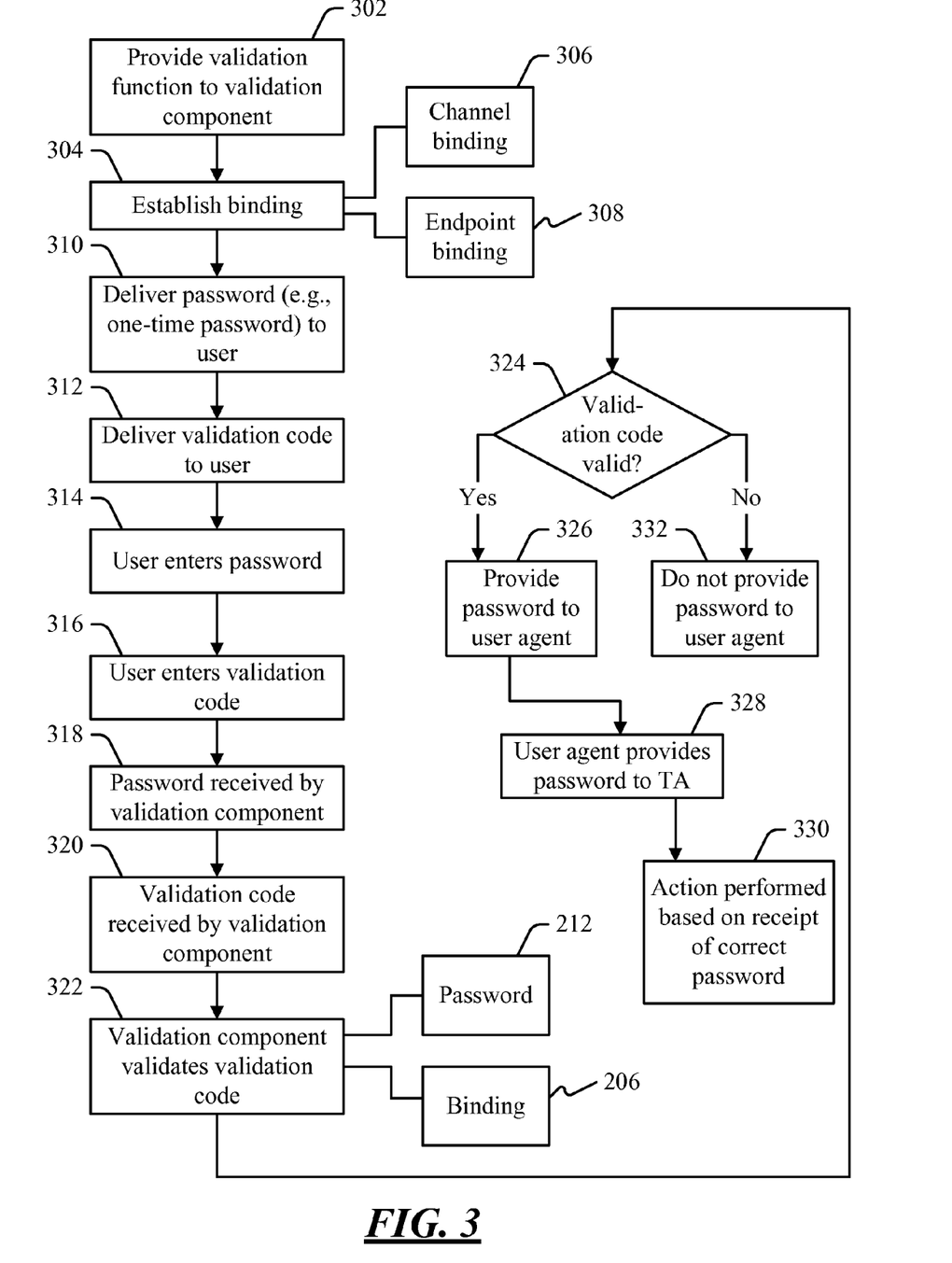
FIG. 3 is a flow diagram of an example process in which a password may be provided to a user, and where the password may be validated before being sent to a target of authentication.

FIG. 3 shows an example process in which a password may be provided to a user, and where the password may be validated before being sent to a target of authentication. Before turning to a description of FIG. 3, it is noted that the flow diagram of FIG. 3 is described, by way of example, with reference to components shown in FIGS. 1 and 2, although these processes may be carried out in any system and are not limited to the scenarios shown in FIGS. 1 and 2. Additionally, the flow diagram in FIG. 3 shows an example in which stages of a process are carried out in a particular order, as indicated by the lines connecting the blocks, but the various stages shown in this diagram can be performed in any order, or in any combination or sub-combination.

At some time before validation is to take place, the validation function that the validation component will use to validate a password is provided to validation component (at 302). As noted above, there may be a function F(password,TA) that calculates a validation code based on a particular password and on a particular binding associated with a TA. This function may be provided to the validation component at 302. One example way of providing the function is to incorporate the function into a plug-in that works with the browser.

At 304, a binding is established for the TA to which the user will prove possession of the password. The binding that is established may be a channel binding 306 that is specific to a particular communication session with the TA. In another example, the binding may be an endpoint binding 308 that is specific to a particular TA, but that is not specific to any particular communication session.

At 310, a password is delivered to a user. In one example, the password is a one-time password that provides only a single instance of access to some resource or process, although any type of password could be provided. As noted above, the password could be delivered to the user by any mechanism. In one example, a physical device in the user's possession (e.g., a dongle) provides the device. In another example, the password is sent to the user remotely by SMS message, e-mail, telephone call, paper mail, or some other method. At 312, a validation code is delivered to the user. The validation code may be calculated based on the password and on a binding of the intended TA, as described above. The validation code may be delivered to the user in the same manner as the password, and may be delivered along with the password (or even as part of the password).

At some point in time, the user is asked to enter the password. For example, the user may visit a particular web site, and the web site may ask the user to enter the password before allowing the user access to some resource, or before allowing the user to perform some process. In response to this request, a validation component may intervene, and may ask the user to enter both the password and the validation code. In response to the request from the validation component, the user enters the password (at 314). Also, the user may enter the validation code (at 316). The validation component receives the password (at 318) and the validation code (at 320). The validation component then validates the validation code (at 322). As noted above, validation may be performed by re-calculating the validation code as a function of (a) the password 212, and (b) the binding 206 of the TA that has requested the password, and by comparing the re-calculated validation code with the validation code that the user entered. If the validation code is valid (as determined at 324), then the validation component provides the password to the user agent (at 326). The user agent then provides the password to the requesting TA (at 328). After the TA receives the password, some tangible action may be performed based on receipt of the password (at 330). For example, as a result of the TA's having verified that the user possesses the password, the TA may grant the user access to a resource, or may allow the user to perform some process. On the other hand, if the validation code is not valid (as determined at 324), then the validation component does not release the password to the requesting TA (at 332). If the validation code turns out not to be valid, this fact may indicate that the user is attempting to send a password to a phishing site. Thus, upon a validation failure, the user agent may alert the user (e.g., by displaying a warning).

Figure 4:
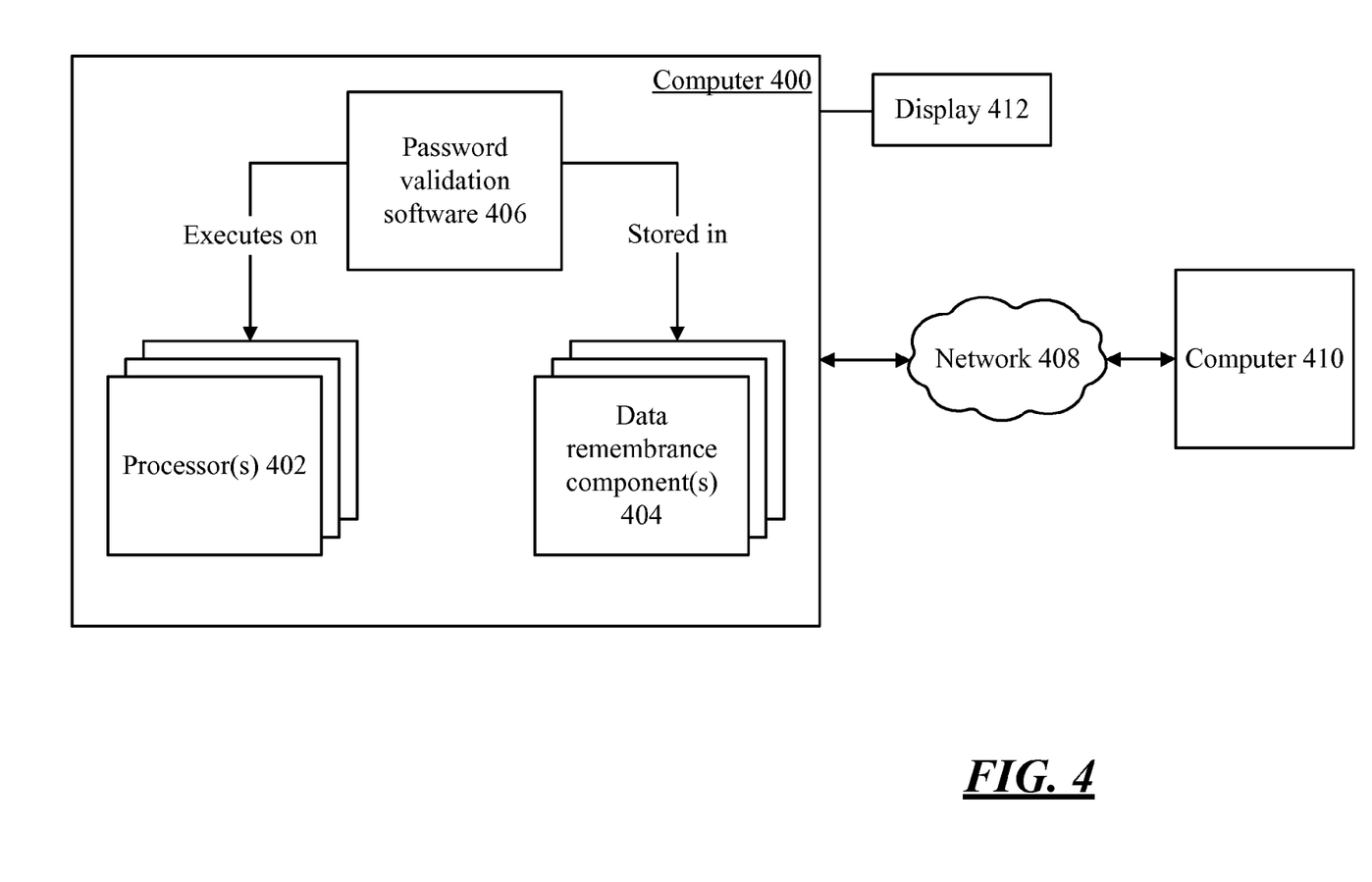
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is password validation software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media. (Tangible media, such as an optical disks or magnetic disks, are examples of storage media.) Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable disks or memories that store executable instructions to perform a validation, wherein the executable instructions, when executed by a computer, cause the computer to perform acts comprising:
  receiving, from an entity, a request for a password, said request for said password being received at a validation component;
  in response to said request, receiving, from a user by said validation component, said password and a first validation code;
  obtaining a binding associated with said entity;
  calculating a second validation code based on said binding and on said password;
  determining, based on a comparison between said first validation code and said second validation code, that said first validation code is valid; and
  based on a determination that said first validation code is valid, releasing said password to a user agent that sends said password to said entity, said user agent being separate from said validation component, said validation component not releasing said password to said user agent until said validation component determines that said first validation code is valid based on both said password and on said entity.

2. The one or more computer-readable disks or memories of claim 1, wherein said binding comprises an endpoint binding that is associated with said entity.

3. The one or more computer-readable disks or memories of claim 1, wherein said binding comprises a channel binding that is associated with said entity and with a particular communication session in which said entity engages.

4. The one or more computer-readable disks or memories of claim 1, wherein said calculating comprises:
  applying a function to said password and to said binding.

5. The one or more computer-readable disks or memories of claim 4, wherein said password and said first validation code are received by said user from said entity, and wherein said entity uses said function to create said first validation code.

6. The one or more computer-readable disks or memories of claim 4, wherein said password and said first validation code are received by said user from a device that is not said entity, and wherein said device uses said function to create said first validation code.

7. The one or more computer-readable disks or memories of claim 1, wherein said acts further comprise:
  gaining access to a resource or process based on having submitted said password to said entity.

8. A method of performing a validation, the method comprising:
  using a processor to perform acts comprising:
    receiving, from an entity, a request for a password, said request for said password being received at a validation component;
    in response to said request, receiving, from a user by said validation component, said password and a first validation code;
    obtaining a binding associated with said entity;
    calculating a second validation code based on said binding and on said password;
    determining, based on a comparison between said first validation code and said second validation code, that said first validation code is valid; and
    based on a determination that said first validation code is valid, releasing said password to a user agent that sends said password to said entity, said user agent being separate from said validation component, said validation component not releasing said password to said user agent until said validation component determines that said first validation code is valid based on both said password and on said entity.

9. The method of claim 8, wherein said binding comprises an endpoint binding that is associated with said entity.

10. The method of claim 8, wherein said binding comprises a channel binding that is associated with said entity and with a particular communication session in which said entity engages.

11. The method of claim 8, wherein said calculating comprises:
  applying a function to said password and to said binding.

12. The method of claim 11, wherein said password and said first validation code are received by said user from said entity, and wherein said entity uses said function to create said first validation code.

13. The method of claim 11, wherein said password and said first validation code are received by said user from a device that is not said entity, and wherein said device uses said function to create said first validation code.

14. The method of claim 8, wherein said acts further comprise:
  gaining access to a resource or process based on having submitted said password to said entity.

15. A system for performing a validation, the system comprising:
  a memory;
  a processor;
  a validation component that is stored in said memory, that executes on said processor, said validation component receiving, from an entity, a request for a password, said validation component in response to said request receiving, from a user, said password and a first validation code, said validation component obtaining a binding associated with said entity, said validation component calculating a second validation code based on said binding and on said password, said validation component determining, based on a comparison between said first validation code and said second validation code, that said first validation code is valid, and said validation component releasing, based on a determination that said first validation code is valid, said password to a user agent that sends said password to said entity,
  said user agent being separate from said validation component, said validation component not releasing said password to said user agent until said validation component determines that said first validation code is valid based on both said password and on said entity.

16. The system of claim 15, wherein said binding comprises a channel binding that is associated with said entity and with a particular communication session in which said entity engages.

17. The system of claim 15, wherein said validation component performs said calculating by applying a function to said password and to said binding.

18. The system of claim 17, wherein said password and said first validation code are received by said user from said entity, and wherein said entity uses said function to create said first validation code.

19. The system of claim 17, wherein said password and said first validation code are received by said user from a device that is not said entity, and wherein said device uses said function to create said first validation code.

20. The system of claim 15, wherein said user gains access to a resource or process based on having submitted said password to said entity.

* * * * *